(12) United States Patent
Talmor et al.

(10) Patent No.: US 10,425,407 B2
(45) Date of Patent: Sep. 24, 2019

(54) SECURE TRANSACTION AND ACCESS USING INSECURE DEVICE

(71) Applicant: Eli Talmor, Haifa (IL)

(72) Inventors: Eli Talmor, Haifa (IL); Rita Talmor, Haifa (IL)

( * ) Notice: Subject to any disclaimer, the term of this patent is extended or adjusted under 35 U.S.C. 154(b) by 138 days.

(21) Appl. No.: 14/905,829

(22) PCT Filed: Jul. 22, 2014

(86) PCT No.: PCT/IB2014/063300
§ 371 (c)(1),
(2) Date: Jan. 18, 2016

(87) PCT Pub. No.: WO2015/015366
PCT Pub. Date: Feb. 5, 2015

(65) Prior Publication Data
US 2016/0191514 A1  Jun. 30, 2016

Related U.S. Application Data

(60) Provisional application No. 61/859,251, filed on Jul. 28, 2013.

(51) Int. Cl.
*H04L 29/06* (2006.01)
*G06F 21/32* (2013.01)
(Continued)

(52) U.S. Cl.
CPC .......... *H04L 63/0861* (2013.01); *G06F 21/32* (2013.01); *G06F 21/42* (2013.01); *G06Q 20/02* (2013.01); *G06Q 20/325* (2013.01); *G06Q 20/385* (2013.01); *G06Q 20/4012* (2013.01); *G06Q 20/40145* (2013.01);
(Continued)

(58) Field of Classification Search
None
See application file for complete search history.

(56) References Cited

U.S. PATENT DOCUMENTS 5,453,601 A * 9/1995 Rosen .................... G06Q 20/02
235/379
9,419,974 B2 * 8/2016 Lim ...................... H04W 12/06
(Continued)

*Primary Examiner* — Kenny S Lin

(57) ABSTRACT

The present invention enables secure transactions or access using insecure endpoint devices, such as computers, tablets and smart-phones. These insecure devices are potentially compromised with malicious software that may attack the user in every possible way. The present invention does not pretend to prevent malware. Instead, malware attacks against secure transactions and access are made obsolete. The present invention includes data, directly connected to transaction or access request to Relying-Party-Service-Provider, into authentication process of Identity-as-a-Service Provider. The present invention includes user authentication using mobile phone vs. Identity-Management-as-a-Service provider. The present invention also includes entering request for secure transaction or access to Relying-Party-Service-Provider, using insecure device. The present invention also includes two-way communication between Relying-Party-Service-Provider and Identity-Management-as-a-Service. The advantages of the present invention include, without limitation, that it is resilient to malware attack.

20 Claims, 8 Drawing Sheets

(51) Int. Cl.
*G06F 21/42* (2013.01)
*G06Q 20/02* (2012.01)
*G06Q 20/32* (2012.01)
*G06Q 20/38* (2012.01)
*G06Q 20/40* (2012.01)
*G06Q 20/42* (2012.01)

(52) U.S. Cl.
CPC ......... *G06Q 20/425* (2013.01); *H04L 63/083* (2013.01); *H04L 63/0853* (2013.01); *H04L 63/10* (2013.01); *H04L 63/18* (2013.01)

(56) References Cited

U.S. PATENT DOCUMENTS

| | | | | |
|---|---|---|---|---|
| 2002/0178385 A1* | 11/2002 | Dent | ........... | G07C 9/00309 726/27 |
| 2003/0135740 A1* | 7/2003 | Talmor | ........... | G06F 21/32 713/186 |
| 2003/0233546 A1* | 12/2003 | Blom | ........... | G06Q 20/02 713/168 |
| 2007/0050840 A1* | 3/2007 | Grandcolas | ........... | G06F 21/42 726/5 |
| 2009/0307764 A1* | 12/2009 | Isobe | ........... | G06F 21/32 726/7 |
| 2010/0131273 A1* | 5/2010 | Aley-Raz | ........... | G10L 17/24 704/247 |
| 2012/0140993 A1* | 6/2012 | Bruso | ........... | G06F 21/32 382/118 |
| 2012/0240203 A1* | 9/2012 | Kling | ........... | G06Q 20/425 726/5 |
| 2013/0133086 A1* | 5/2013 | Liberman | ........... | G09C 5/00 726/28 |
| 2013/0219479 A1* | 8/2013 | DeSoto | ........... | H04W 12/06 726/6 |
| 2014/0197232 A1* | 7/2014 | Birkler | ........... | G06F 21/313 235/375 |
| 2016/0132864 A1* | 5/2016 | Barrese | ........... | G06Q 20/3274 382/190 |

* cited by examiner

| # | Requested action | Authorization code |
|---|---|---|
| 9 | Relying website – new user open account | random 4 digits number |
| 10 | Relying website – returning user login | account-specific 4 digits number |
| 11 | Bank website – relying third party money transfer | 4 last digit of destination bank account |
| 12 | Online store - relying payment processor | 4 last digits of National ID number of recipient of transaction goods or services. |
| 13 | ATM Cash withdrawal - relying payment processor – credit card not present | 4 digit – card verification value for "card-not-present" transactions |
| 14 | Point-of-sale- relying payment processor | 4 digits of transaction amount |
| 15 | Election website – relying online voting | 4 digits of one the vote choices (for example – one of the candidates will be numbered as 7651) |
| 16 | Electronic Signature of text messages (SMS or Tweets) | Any 4 digits present in the message |
| 17 | Mobile applications (for example Gaming, Financial, Dating , Smart Home, Messaging) | Any 4 digits chosen by user, authorizing application to request user's ID. |

Fig. 4

SECURE TRANSACTION AND ACCESS USING INSECURE DEVICE

The following invention claims the benefits of provisional U.S. patent application Ser. No. 61/859,251.

TECHNICAL FIELD

The present invention is in the field of Information Technology (IT) Security. More specifically it refers to user willing to gain access to IT resources of Relying Party Service Provider or execute transaction using Relying-Party-Service-Provider, using any endpoint or network-connected device. Furthermore it refers to user authentication using mobile phone vs. Identity-Management-as-a-Service in order to secure user's transaction or access with Relying-Party-Service-Provider.

BACKGROUND ART

The architecture of Identity Software-as-a-Service (SaaS) systems is based on concept of service providers or Relying-Party-Service-Providers, identity provider or Identity-Management-as-a-Service and clients or users (see for example U.S. Pat. No. 8,205,247 B2). Relying-Party-Service-Providers enable user's access and transactions. Identity-Management-as-a-Service verifies user's identity.

Users routinely gain access to IT resources or execute transactions using variety of endpoints or network-connected devices, such as PCs, laptops, tablets, smart-phones, etc. These users are filling user-action-request-forms for login or transaction vs. Relying-Party-Service-Providers. These users are also challenged to provide their username/password and/or some kind of hardware/token or smartcard and/or to provide their biometric characteristics such as face, finger, voice, iris, etc. It is understood, that increasing authentication complexity, does not bring more security, while adding considerable cost and inconvenience.

The main obstacle to better security is that network-related devices and endpoints, such as computers, tablets, smart phones, etc. are generally insecure. For example: David Dill, Professor of Computer Science at Stanford University, Calif., USA, co-authored "Computer Technologists' Statement on Internet Voting" where he states that "The voting system as a whole must be verifiably accurate in spite of the fact that client systems can never be guaranteed to be free of malicious logic. Malicious software, firmware, or hardware could change, fabricate, or delete votes, deceive the user in myriad ways including modifying the ballot presentation" (see ref. 11).

Numerous schemes were developed for strong authentication. For example: in authentication, out-of-band refers to utilizing two separate networks or channels, one of which being different from the primary network or channel, simultaneously used to communicate between two parties or devices for identifying a user. A cellular network is commonly used for out-of-band authentication. An example of out-of-band authentication is when an online banking user is accessing their online bank account with a login and a one time password (OTP) is sent to their mobile phone via SMS to identify them. The primary channel would be the online login screen where the user enters their login information and the second separate channel would be the cellular network. This process is sometimes called 2-step verification (used by Google and others). This is sequential, step after step process, where user is challenged by the website to enter OTP. This added layer of security prevents the likelihood of hackers and malware from compromising access to the complete authentication process, however, this method of authenticating a user is known to be vulnerable to man-in-the-mobile (MITMO) attacks.

Another malicious software attack is called Man-in-the-Browser attack. Man-in-the-Browser is a proxy Trojan horse that infects a web browser by taking advantage of vulnerabilities in browser security to modify web pages, modify transaction content or insert additional transactions, all in a completely covert fashion invisible to both the user and host web application. Man-in-the-Browser simply waits until user login using any authentication (weak or strong) and then steals user's money.

Recently issued U.S. Pat. No. 8,028,896 B2 teaches on "Authentication Methods for use in Financial Transactions and Information Banking" EP 2 065 798 A1 patent application teaches on "Method for performing secure online transactions with a mobile station and a mobile station". None of these patents addresses the issue of malware and insecure endpoint devices. US 2012/0240203 A1 application on "Method and Apparatus for Enhancing Online Transaction Security via Secondary Confirmation" proposes to deal with PC being insecure device by sending secondary transaction to mobile device. This approach does not solve the problem, for example, due to the man-in-the-mobile attack.

Therefore the need exists for a method and a system for secure transaction and access using insecure endpoint devices.

SUMMARY OF INVENTION

Technical Problem

The problem to be solved is the need to authenticate the user and to execute user's request for access or for transaction on any endpoint device, so that the whole process will be secure from malicious attacks.

Solution to the Problem

The user willing to execute request for access or transaction vs. Relying-Party-Service-Provider (bank, online shop, etc.) is requested to perform strong authentication vs. Identity-Management-as-a-Service Provider (where user is already registered). The present invention separates user authentication (vs. Identity-Management-as-a-Service), user action-request (vs. Relying-Party-Service-Provider) and action-request-authorization (between Relying-Party-Service-Provider and Identity-Management-as-as-Service) into three steps, introducing novel 3-step verification, including the following distinctive features:

1. The present invention changes the verification topography from user-centric (user is the last node to request authorization) to service-centric (service is the last node to request authorization). This topography change is crucial in malware environment, since user's endpoint device and user's mobile phone are potentially malware compromised, while service provider's network and computers are generally malware free.
2. The present invention provides for phone-based, clientless, voice-channel, strong authentication, preferably with voice biometrics match performed at the Identity-Management-as-a-Service provider side. The prevent invention is applicable to any phone. The most ubiquitous and user-convenient device is mobile phone. We will refer, hereinafter, to mobile phone.
3. The present invention requires that data, directly-connected with transaction or access details, to be included during voice channel strong authentication.
4. The present invention provides easy integration with multiple applications and Relying-Party-Service Providers, for example:

4.1 New user open account at Relying-Party-Service-Provider website
4.2 Returning user login at Relying-Party-Service-Provider website:
4.3 Third party money transfer at Relying-Party-Bank website
4.4 Online store at Relying-Party-Payment Processor
4.5 ATM Cash withdrawal at Relying-Party-Payment Processor
4.6 Point-of-sale at Relying-Party-Payment Processor
4.7 Online voting at Relying-Party-Election website
4.8 Electronic Signature of text messages (SMS or Tweets)
4.9 Mobile application (Gaming, Financial, Dating, Smart Home, Messaging)

Advantageous Effects of Invention

The present invention has the advantage for being resilient to malware attacks, while being applicable to any endpoint device and wide variety of applications. Since it is client-less, without software running on mobile phone, malware way to attack is to impersonate user's interaction with Identity-Management-as-a-Service. This voice impersonation can be mitigated by utilizing user's Voice Biometrics verification. The further advantage is usage of widely ubiquitous mobile phone as the authentication device, without the need for specialized hardware or software. The further advantage is similar, intuitive and user-friendly experience for wide variety day-to-day activities. The further advantage is ease of integration with multiple user-requested-actions and applications.

BRIEF DESCRIPTION OF DRAWINGS

Various exemplary embodiments are illustrated by way of example, and not by way of limitation, in the figures of the accompanying drawings in which like reference numerals refer to similar elements and in which:

FIG. 4 is an example of different authorization codes that different Relying-Party-Service Providers and applications may use with the present invention.

DESCRIPTION OF EMBODIMENTS

A system and method for conducting transactions and access using insecure endpoint devices is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
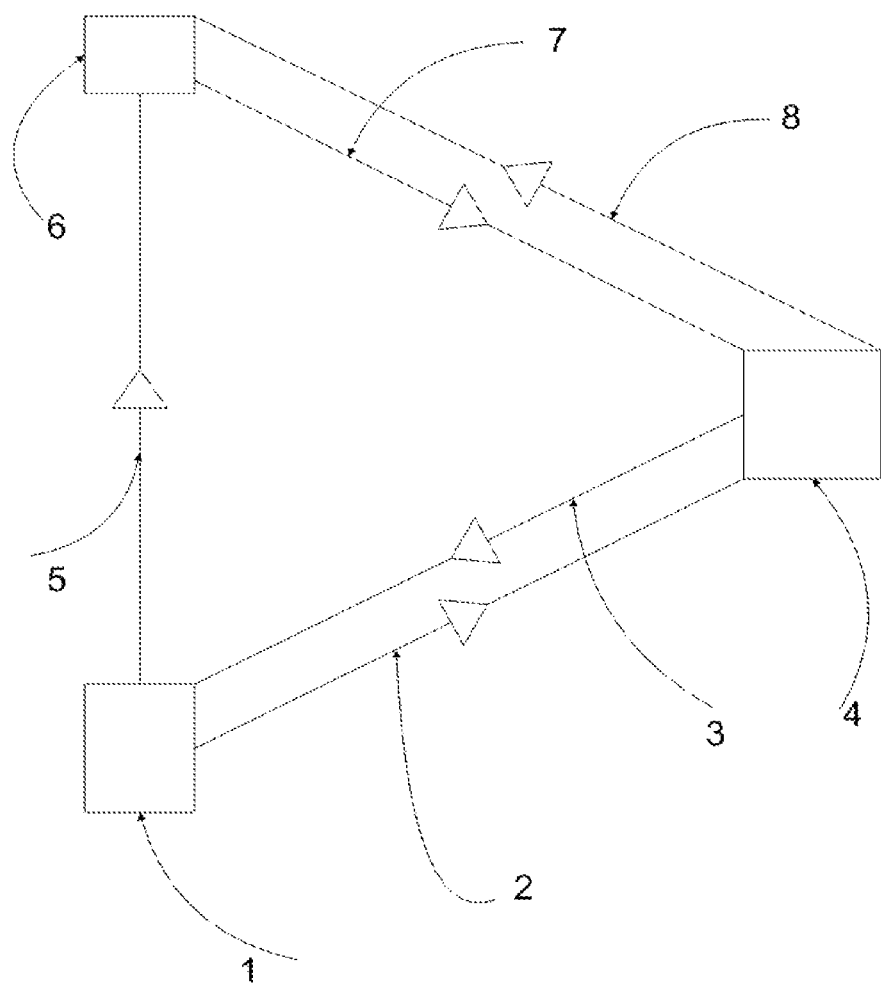
FIG. 1 is a flowchart of 3-step verification, including User, Relying-Party-Service Provider and Identity-Management-as-a-Service.

Referring now to FIG. 1 the embodiment of the present invention includes the following steps:

Step A: User 1 dials-in 2 Identity-Management-as-a-Service 4. Identity-Management-as-a-Service 4 prompts user to say user's Personal Identification Number (PIN) and identifies Caller ID number of user's mobile phone, thus comprising user's two tier of authentication. If user's identity is verified, then Identity-Management-as-a-Service prompts user to say requested-action authorization code.

Authorization code is defined by Relying-Party-Service-Provider as digital code, being directly connected to user's login or user's transaction vs. Relying-Party-Service-Provider. See FIG. 4 for examples of different authorization codes. Please note that the Identity-Management-as-Service 4 cannot know what action user is requesting, thus ensuring user's privacy.

Identity-Management-as-a-Service 4 repeats authorization code and asks user for confirmation. On positive confirmation-Identity-Management-as-a-Service tells user multi-digit Pass-code 3 (for example—8 digit number).

Step B: User fills in action-request-form 5 (i.e. login or transaction request) for Relying-Party-Service-Provider website 6. The form will include multi-digit Pass-code of Step A and Online Identity-as-a-Service web address (alternatively—the form will not include web address if it is known upfront, when Relying-Party-Service-Provider is registering with Identity-Management-as-a-Service).

Step C: Relying-Party-Service-Provider 6 receives the form of Step B and detects existence of Identity-Management-as-a-Service web address and multi-digit Pass-code. Then, Relying-Party-Service-Provider queries web address 7 of Identity-Management-as-a-Service with multi-digit Pass-code. Identity-Management-as-a-Service returns 8 user's ID and user's action authorization code. Relying-Party-Service-Provider 6 matches user's ID with user's authorization privileges and matches user's action authorization code with transaction or access request content, that user submitted to Relying-Party-Service-Provider 6 (for example matching transaction data with 4-last digits of transaction recipient bank account). This results in secure transaction, even though the endpoint device, used to submit the transaction online, may be insecure and compromised by malware.

The preferred embodiment of present invention uses Voice Biometrics (as described in U.S. Pat. Nos. 5,913,196 and 6,510,415) to prevent malware attacks on voice interaction channel between the user and the Identity-Management-as-a-Service. The Voice Biometrics match is performed on Identity-Management-as-a-Service side, using the voice data provided by the user during the interaction with the Identity-Management-as-a-Service.

FIGS. 2, 3, 4 and 5 are further describing invention and its embodiments.

Figure 2:
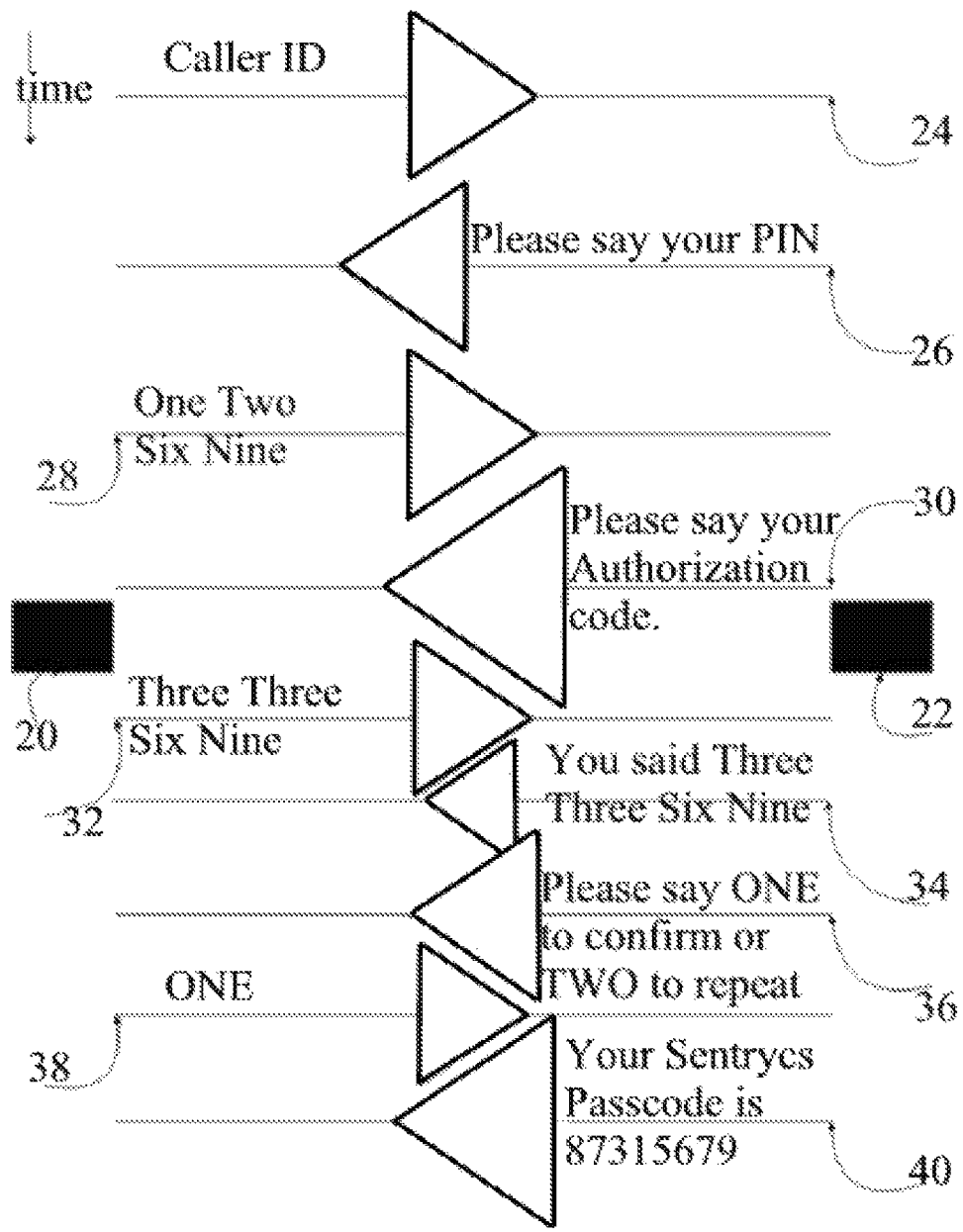
FIG. 2 is a flowchart of an interactive, voice-only, phone call, between the User and the Identity-Management-as-a-Service.

Referring now to FIG. 2, describing Voice Only call flow of Step A in par. [0015]. The interaction between the Identity-Management-as-a-Service 22 and the user 20, starts with Caller ID detection 24, followed by three service challenges (26,30,36) and three (one static and two variable) user responses (28,32,38), service confirmation using Service speech recognizer output (34) and is finalized by service random result (40). Voice Biometrics in conjunction with Automatic Speech Recognition (ASR), running on the Identity-Management-as-a-Service side, is the preferred mode of operation.

Referring again to FIG. 2—potential malware attacker would need to possess at least text-to-speech and speech recognition engines in order to attack Identity-Management-as-a-Service. During the session, according to FIG. 2, the attacker has to perform the following steps:

- 28: Get (steal) PIN and say it in response to Identity-Management-as-a-Service challenge (requires malware text-to-speech engine),
- 32 Pre-determine authorization code and say it in response to challenge (requires malware text-to-speech engine),
- 34: Recognize confirmed authorization code (requires malware speech recognition engine),
- 38: Pre-determine variable response (one/yes or two/no) and say it in response to challenge (requires malware text-to-speech engine),
- 40: Recognize Pass-code as digits (requires malware speech recognition engine).

In addition-malware will need to insert this Pass-code into a fraudulent transaction corresponding to pre-determined authorization code 32 above.

This analysis clearly shows that in order to prevent malware attack Identity-Management-as-a-Service should preferably use Voice Biometrics in conjunction with Automatic Speech Recognition.

Figure 3:
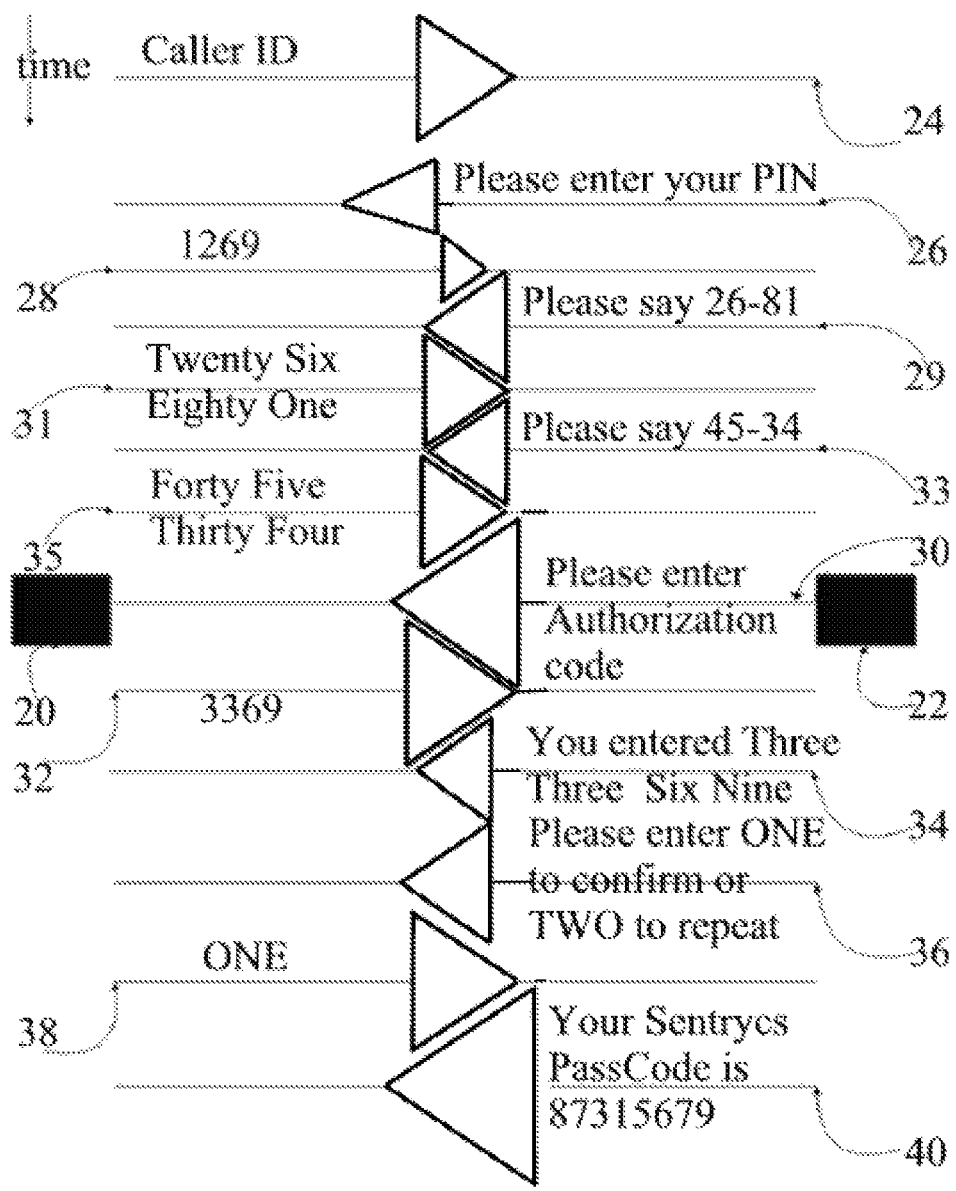
FIG. 3 is a flowchart of an interactive, mixed DTMF (Dual-Tone-Multi-Frequency) signaling and voice, phone call, between the User and the Identity-Management-as-a-Service.
Figure 5:
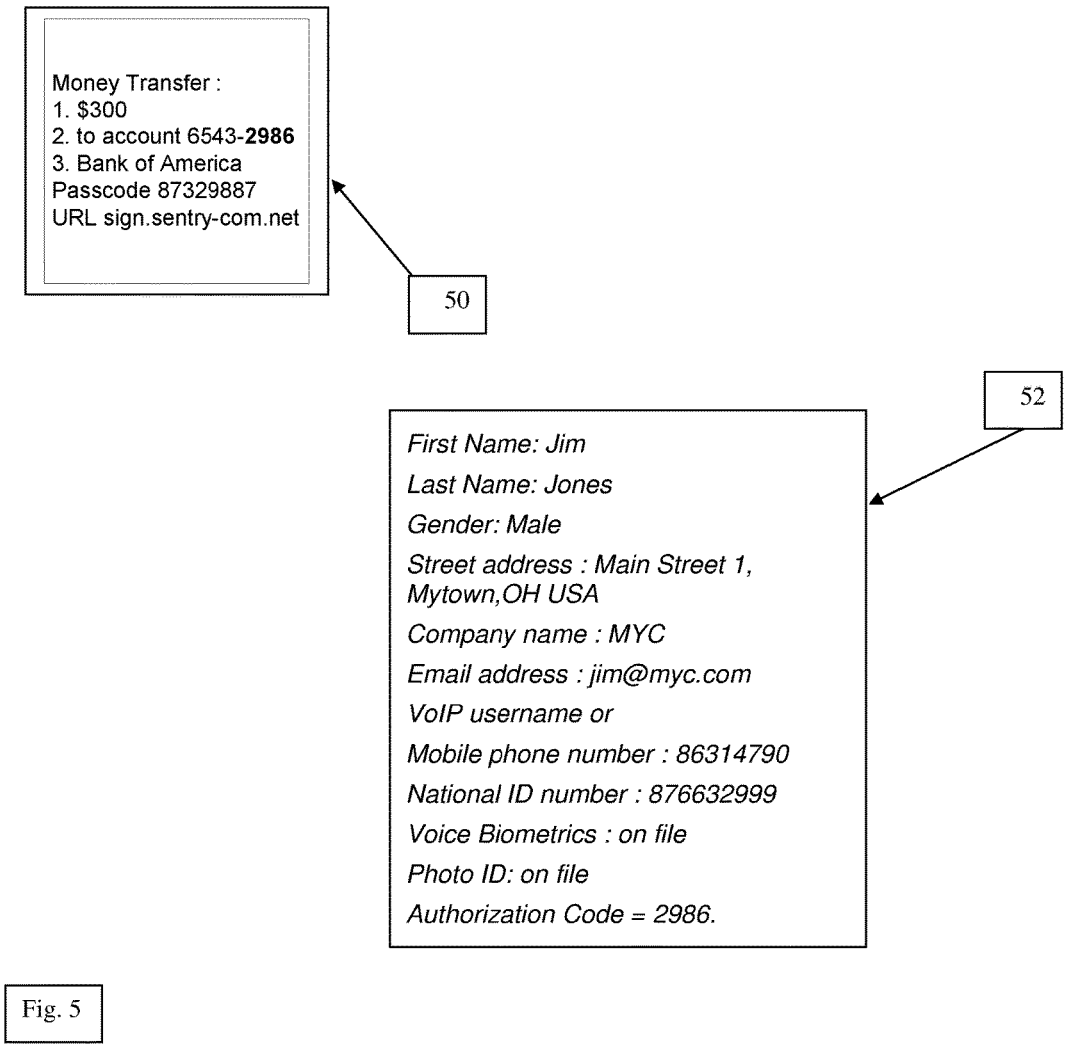
FIG. 5 is a data flow example for third-party money transfer authorization.

Referring now to FIG. 3, that describes mixed Voice and DTMF phone call flow, of Step A in par. [0015]. According to this embodiment of present invention: User 20 enters PIN and Authorization Code using dial-pad and DTMF.

Referring now to potential malware attacker of embodiment in FIG. 3: malicious software would need to possess at least key-logger/key-generator and speech recognition engines. This analysis again shows that, in order to prevent key-logger/key generator attack, Identity-Management-as-a-Service should preferably use Voice Biometrics in conjunction with DTMF Recognition. In this embodiment it may be further advantageous that user to be prompted to say random-digits combinations providing additional protection from record-and-playback attack. These random-digits combinations are to be used in Voice Biometrics Match, running on the Identity-Management-as-a-Service side.

Authorization codes are to be determined by Relying-Party-Service-Providers, including Web applications Providers and Mobile applications Providers. FIG. 4 is an example of different authorization codes. Although FIG. 4 refers to 4-digit codes—any code length can be used. Further referring to FIG. 4—authorization codes for action 9 and 10 are preset to distinguish between opening new account and login into existing account. For example: for opening new account authorization code may be any random 4 digits number. For login into existing account authorization code may be account-specific authorization code. Authorization code for action "banking transfer" 11 may refer to last 4 digit of the destination account, i.e. the recipient of the money transfer. Authorization code for action "online store" 12 may refer to National ID number of the recipient of the transaction goods or services, Authorization code for action "cardless ATM Cash withdrawal" 13 may refer to CVV-card verification value, required for "card not present" transactions. If CVV includes 3 digits only—as used by VISA—then authorization code may start from 0, for example 0354. Authorization code for action "point-of-sale" 14 may refer to transaction amount in 4-digit format, thus providing a way for non-repudiation of specific transaction by specific user. Authorization code for action "election" 15 may refer to one of the online voting choices. Authorization code for action "text message" 16 may refer to any digits present in the text message. Authorization code for action "mobile application" 17 may refer to number chosen by user during mobile application activation.

From privacy perspective—authorization code also serves as electronic signature whereby the user is authorizing Identity-Management-as-a-Service to provide Relying-Party-Service-Provider with user's ID.

To further demonstrate the embodiment of present invention we will show how to implement the Step B of par. [0016]. We are referring now to FIG. 5, regarding data flow example for money transfer authorization (action 11 of FIG. 4): Following interaction with Identity-Management-as-a-Service, as described in FIG. 2 or FIG. 3, the user submits to the bank the form 50.

To further demonstrate the embodiment of present invention we will show how to implement the Step C of par. [0017]. Referring again to FIG. 5—the bank contacts web address (for example sign.sentry-com.net), present in the form 50, and posts Pass-code 87329887, also present in the form 50. The post should also include the bank's identifiers vs. Identity-Management-as-a-Service. In another embodiment—contact web address does not need to be present in the form and needs to be preset, upfront, by the bank. The preferred communication protocol between Identity-Management-as-a-Service and Relying-Party-Service-Provider is oAuth (see reference 12.)

The Identity-Management-as-a-Service returns form 52—user's Identity Information and user-provided Authorization Code. The bank matches user's Identity Information and Authorization Code=2986 with last 4 digits of destination account 6543-2986. The bank approves the transfer.

In yet another embodiment of present invention, referring again to FIG. 2, user authentication may be further enhanced, vs. described in par [0015]. For example: by combining Mobile Operator authentication data with Identity-Management-as-Service data. For example, at the same instance in time and the same Cell ID (mobile operator antenna location)—we may detect mobile phone SIM (Subscriber Identity Module) ID and Identity-Management-as-a-Service ID (described by 52 in FIG. 5). In other Cell ID we may possibly detect SIM ID without Identity-Management-as-a-Service ID. Therefore we may conclude that the latter SIM is "cloned". This is advantageous in preventing SIM "cloning". So combining all factors we will get multi-factor identification: SIM, Caller ID, PIN and Voice Biometrics. This has an additional advantage of improved security.

Referring again to Step A of par. [0015] and FIG. 2. If wrong PIN is entered for a number of times (say ~5) in a row—the user's account may be disabled. This has an advantage of preventing PIN guessing by attacker, after stealing mobile phone, resulting in improved security.

Referring again to Step A of par. [0015] and FIG. 2—the multi-digit Pass-Code may expire after preset time interval. For example it may expire after a number of minutes (say ~5). This has an advantage of improved security.

Figure 6:
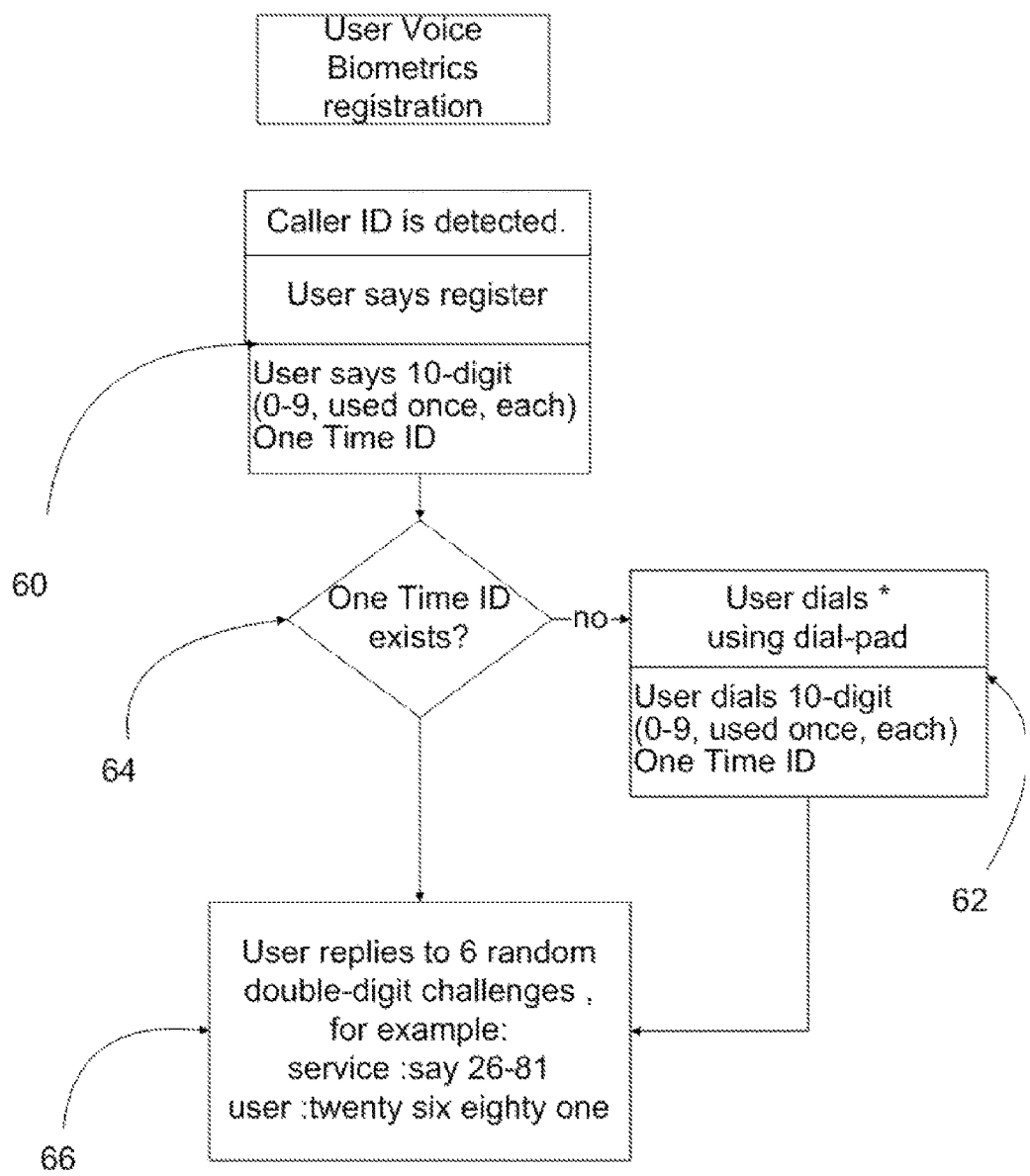
FIG. 6 is a flowchart of Voice Biometrics Registration process.

To initiate Identity-Management-as-a-Service the user must claim his ID. The user must register providing user's IDs, for example First Name, Last Name, Email and Company Name. On receipt of these data-Identity-Management-as-a-Service may generate multi-digit number, to be referred hereafter, as One Time ID. This number may include digits from 0 to 9, used each, at least once. Referring to FIG. 6: the user will dial in Identity-Management-as-a-Service, say Register and then say One Time ID 60 and then say additional prompted digits 66. In alternative embodiment the user may skip saying Register, since the Identity-Management-as-a-Service may detect that specific mobile phone Caller ID is not registered yet. In another embodiment the user will not be prompted additional digits 66 in order to shorten the duration of registration session. In another embodiment Voice Biometrics enrollment may involve any spoken word or phrase.

On registration completion—the user will receive Personal Identification Number or PIN, for example 4-digit long, to be used for authentication.

The claimed user ID has to be validated by the Identity-Management as-a-Service. To this end—user may email picture of user's Photo ID (for example driver's license), using Email address provided at the registration or any other secure means. In yet another embodiment claimed user ID may be validated by the Relying-Party-Service-Provider, for example by the Bank validating ID's of its customers.

Figure 7:
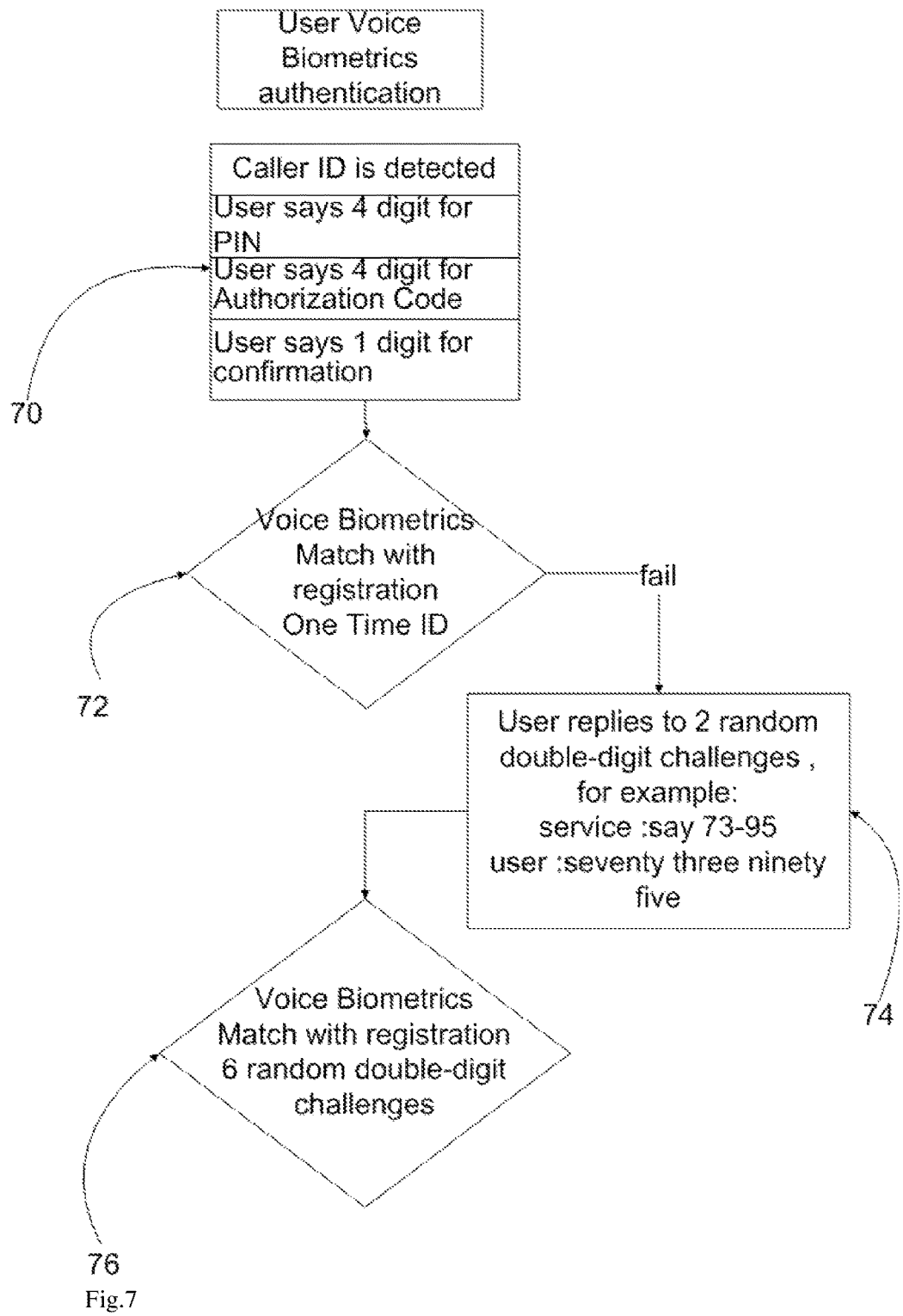
FIG. 7 is a flowchart of Voice Biometrics Authentication process.

Referring to FIG. 7: there are two consecutive options for Voice Biometrics authentication match: one using the match of spoken PIN digits 70 and spoken authorization code digits 70 with spoken One Time ID digits 72. If the match fails—it may be followed by the random double-digit match 74, 76. This has an advantage of reducing False Rejection Rate of Voice Biometrics. In yet another embodiment the user will not be prompted additional digits 74 in order to shorten the duration of authentication session and improve user convenience.

The user may further perform self-serving administration functions vs. the Identity-Management-as-a-Service:
 The user may audit ID data
 The user may audit transaction/registration history
 The user may request to register on other mobile phone,
 The user may request to delete his/her mobile phone account, if it is lost or stolen.
Furthermore, the Relying-Party-Service-Provider may audit transaction and access data vs. the Identity-Management-as-a-Service.

As mentioned before, the possibility exists for user impersonation, via recording user speech responses during Identity-Management-as-a-Service session and playback these responses, using external, microphone-equipped, hardware device. It is therefore advantageous to include additional random challenge to the user. It is possible randomize the word used for confirmation 36 of FIG. 2. If authorization code is entered correctly, the user may be prompted, randomly, to say one the words from the group, including words confirm, approve, accept, agree, authorize or okay. If entered incorrectly—the user should say repeat. This has an advantage of precluding record and playback attack.

Another possibility exists for user impersonation, via recording user speech responses during Identity-Management-as-a-Service session and replay these responses by malicious software, without external, microphone-equipped, hardware device. It is important to know, (see for example ref. 13), that during the phone session it is impossible to replay recorded audio. Only live audio through the mobile phone microphone is allowed. Therefore replay attack by malware is prevented by operating system.

In addition Voice Biometrics engine may recognize these replay recordings as being nearly identical to one stored in Identity-Management-as-a-Service Memory. For example, current PIN voiceprint may be compared with previous PIN recordings. If voiceprint match is less than preset threshold, then recording should be reported and rejected.

Refs 14 and 15 describes state-of-the-art Trojans capable of speech recognition and key-logging. It is clear to skillful in the art that present invention precludes, presently known malicious software, from tampering with secure transactions and access.

It is well understood that malicious software may evolve in the future. It is therefore useful to examine potential future malware attack vectors against present invention: One may argue that the attacker may, in principle, attack the present invention using at least one of the following attack vectors: "steal user's voice" or "steal user's multi-digit pass-code" or "steal user's mobile phone".

Examining closely each attack vector:
 "Voice Stolen Attack".
This attack vector includes the following steps:
 Spoof Caller ID
 Record user's voice session and either
 Playback recording,
 or
 Build user's voice model and use speech synthesis.
In order to reject this attack—Voice Biometrics match has to include the ability to reject recorded and playback speech, for example as described in U.S. Pat. Nos. 6,480,825 B1, 8,442,824 B2.

In both cases—playback of voice recording or playback of synthesized speech—attacker will need to use microphone from external hardware device in order to deliver speech to the mobile phone, thus modifying Voice Biometrics data. Therefore skillful in the art may detect and reject "Voice Stolen Attack". This physical limitation cannot be overcome by attackers.

"Stolen multi-digit pass-code"
This attack vector includes the following steps:
 Eavesdrop to the Identity-Management-as-a-Service session,
 Intercept multi-digit pass-code,
 Block user's transaction vs. the Relying-Party-Service-Provider,
 Execute attacker's transaction vs. the Relying-Party-Service-Provider.
The present invention protects transaction-connected data (the authorization code) from being modified by the attacker. Therefore the attack will be rejected, because user's transaction data, by definition, does not match attacker's transaction data.

"Mobile Handset Stolen"
 Initiate the Identity-Management-as-a-Service session,
 Guess PIN,
 Use random-attacker Voice.
In order to minimize the effect of such an attack—the user must report lost/stolen handset to the Identity-Management-as-a-Service.

During the period between the mobile phone theft and reporting to the Identity-Management-as-a-Service provider—the probability of attack success equals the probability of guessed PIN times False Acceptance Rate of Voice Biometrics. For 4-digit PIN and typical Voice Biometrics False Acceptance Rate of 0.01, we may estimate that probability of this random attack success, as being negligible ~1/1,000,000.

Thus, we conclude that the present invention is resilient to fraudster attack, now and in the foreseen future.

Figure 8:
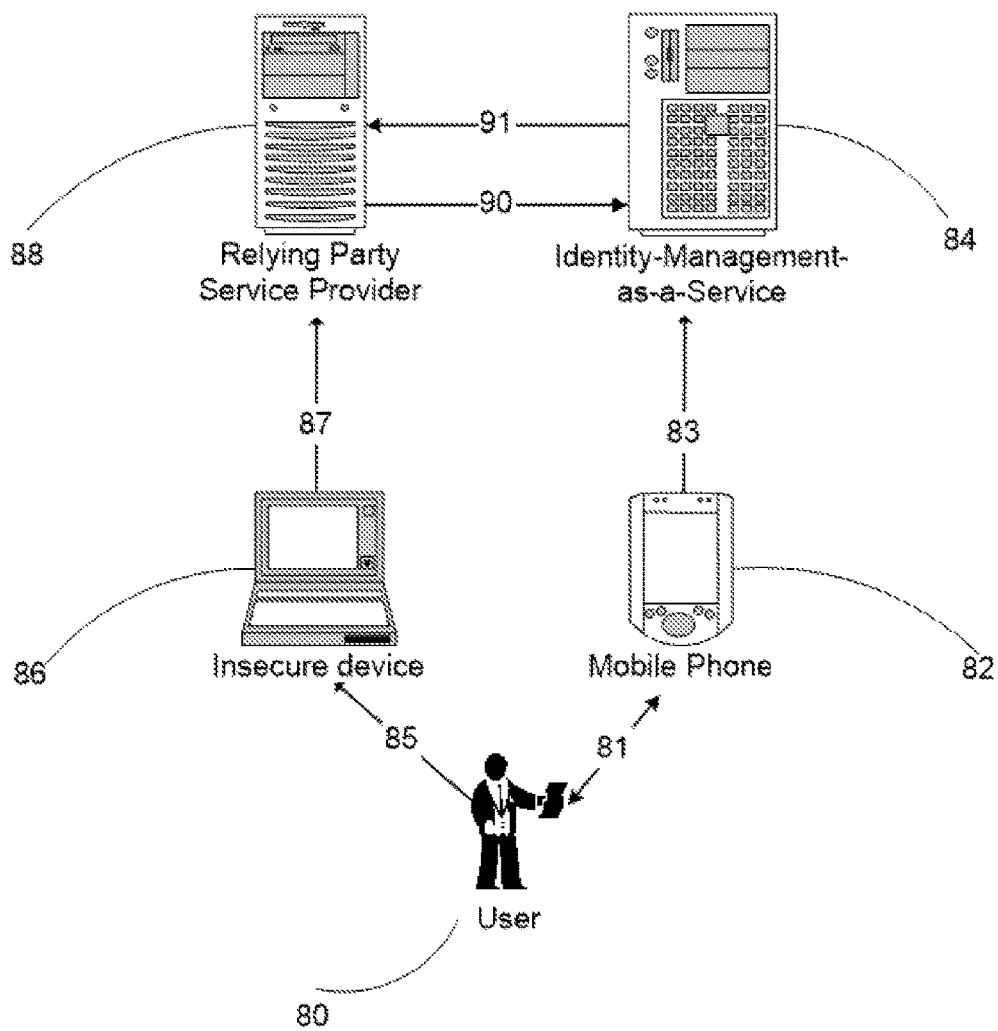
FIG. 8 is a diagram of a system providing for secure transactions and access according to the present invention.

FIG. 8 is the diagram of the system, according to the present invention; comprising the user 80 interacting vocally 81 using user's mobile phone 82 over mobile network 83 with Identity-Management-as-Service 84. The Service comprises the means of processing phone call data, performing user's authentication and communicating with Relying-Party-Service-Providers, as described for example in U.S. Pat. No. 7,689,832 B2. Following successful vocal interaction 81—user 80 enters data 85 into insecure device 86 and sends this data over network 87 to Relying-Party-Service-Provider 88. Relying-Party-Service-Provider sends query 90 including multi-digit pass-code to Identity-Management-as-a-Service Provider 84, preferably over SSL connection. Identity Verification-as-a-Service Provider returns 91 user's ID and secured transaction data, spoken by the user 80.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

CITATION LIST

Patent Literature (1) U.S. Pat. No. 8,205,247 B2
(2) U.S. patent application Ser. No. 61/859,251
(3) U.S. Pat. No. 8,028,896 B2
(4) US 2012/0240203 A1
(5) EP 2 065 798 A1
(6) U.S. Pat. No. 5,913,196
(7) U.S. Pat. No. 6,510,415
(8) U.S. Pat. No. 6,480,825 B1
(9) U.S. Pat. No. 8,442,824 B2
(10) U.S. Pat. No. 7,689,832 B2

Non-Patent Literature

(11) "Computer Technologists' Statement on Internet Voting" on www.verifiedvoting.org
(12) "Oauth" on www.wikipedia.org
(13) "Media Playback" on www.developer.android.com/guide
(14) "Soundcomber: A Stealthy and Context-Aware Sound Trojan for Smartphones", by Kapadia et al, Indiana State University, on www.cs.indiana.edu
(15) Soundcomber Demo on www.youtube.com

What is claimed is:

1. A system for secure transaction and access, comprising:
   a. Relying-Party-Service-Provider for transaction and access of a user;
   b. an insecure endpoint device, for communication of the user with the Relying-Party-Service-Provider, and compromised by unknown malware;
   c. such malware capable of modifying transaction context or altering access request;
   d. a mobile phone of the user;
   e. Remote Identity-Management-as-a-Service for identity verification of the user using said mobile phone and serving remotely said Relying-Party-Service-Provider;
   f. whereas said Relying Party-Service Provider and said Identity-Management-as-a-Service receive the same authorization code from said user;
   g. whereas this authorization code is being generated by Relying Party-Service-Provider, the value of this code depending on transaction or access request of said user;
   h. whereas said transaction and access authorization is requested by said Relying-Party-Service-Provider, using said authorization code, from said Identity-Management-as-a-Service, thus defeating said malware.

2. The system of claim 1 where the user uses a voice channel or DTMF channel of said mobile phone to interact with the Identity-Management-as-a-Service, whereas said Identity-Management-as-a-Service performs a strong authentication of said interacting user.

3. The system of claim 2 where said interaction includes a spoken PIN and a spoken authorization code, wherein said PIN is being assigned to the user following registration with the Identity-Management-as-a-Service and said authorization code, determined by Relying-Party-Service-Provider, is directly connected to an access or transaction request of said user to the Relying-Party-Service-Provider.

4. The system of claim 3 where the strong authentication by Identity-Management-as-a-Service includes a Caller ID, the PIN and a Voice Biometrics match, where the Voice Biometrics has the ability of rejecting the user's voice replay and the user's voice playback and the user's voice synthesis, preceded by the user's voice recording.

5. The system of claim 4 where the user receives the Identity-Management-as-Service response, followed by the user adding said response into the access or transaction request to the Relying-Party-Service-Provider, using the insecure endpoint device.

6. The system of claim 5 where the Relying-Party-Service-Provider sends said response, added to said request, to the Identity-Management-as-a-Service, wherein the Identity-Management-as-a-Service returns a user's ID and the authorization code.

7. The system of claim 6 where Relying-Party-Service-Provider matches the user's ID and the authorization code with the transaction or access request received from the insecure endpoint device.

8. The system of claim 2 where interaction includes a keypad-entered PIN and a keypad-entered authorization code, wherein said PIN is being assigned to the user following registration with the Identity-Management-as-a-Service and authorization code, determined by Relying-Party-Service-Provider, is directly connected to an access or transaction request of said user to the Relying-Party-Service-Provider.

9. The system of claim 1 where the insecure endpoint device may be one of the network-connected devices, such as: personal computers, laptops, tablets, smart-phones and mobile phones, including the user's mobile phone.

10. The system of claim 1 where the Relying-Party-Service-Provider may be one of the group consisting of Banks, Financial Services, Online Shops, Online Voting Sites, Enterprise Websites, Smart Home, Mobile and Web applications.

11. A method for secure transaction and access, comprising an interaction between a user; a mobile phone of the user; an insecure endpoint device, performing communication of the user with Relying-Party-Service-Provider and compromised by unknown malware, such malware capable of modifying transaction context or altering access request; Remote Identity-Management-as-a-Service, performing identity verification of the user and serving remotely said Relying-Party-Service-Provider; and Relying-Party-Service-Provider, performing transaction and access of the user; whereas said Relying Party-Service Provider and said Identity-Management-as-a-Service receive the same authorization code from said user; whereas this authorization code is being generated by Relying Party-Service-Provider, the value of this code depending on transaction or access request of said user; and whereas said transaction and access authorization is requested by said Relying-Party-Service-Provider, using said authorization code, from said Identity-Management-as-a-Service, thus defeating said malware.

12. The method of claim 11 where the user uses a voice channel or DTMF channel of said mobile phone to interact with the Identity-Management-as-a-Service, whereas said Identity-Management-as-a-Service performs a strong authentication of said interacting user.

13. The method of claim 12 where the interaction includes a spoken PIN and an authorization code, wherein said PIN is being assigned to the user following a registration with the Identity-Management-as-a-Service and said authorization code, determined by Relying-Party-Service-Provider, is directly connected to an access or transaction request of said user to the Relying-Party-Service-Provider.

14. The method of claim 12 where interaction includes a keypad-entered PIN and a keypad-entered authorization code, wherein said PIN is being assigned to the user following a registration with the Identity-Management-as-a-Service and said authorization code, determined by Relying-Party-Service-Provider, is directly connected to an access or transaction request of said user to the Relying-Party-Service-Provider.

15. The method of claim 12 where the strong authentication includes a Caller ID, the PIN and a Voice Biometrics match, where the Voice Biometrics has the ability of rejecting the user's voice replay and the user's voice playback and the user's voice synthesis, preceded by the user's voice recording.

16. The method of claim 12 where the user receives the Identity-Management-as-Service response, followed by the user adding said response into the access or transaction request to the Relying-Party-Service-Provider, using the insecure endpoint device.

17. The method of claim 16 where the Relying-Party-Service-Provider sends said response to the Identity-Management-Service Provider, where the Identity-Management-as-a-Service returns a user's ID and the authorization code.

18. The method of claim 17 where Relying-Party-Service-Provider matches the user's ID and the authorization code with the transaction or access request received from insecure endpoint device.

19. The method of claim 11 where the insecure endpoint device may be one of the network-connected devices, such as: personal computers, laptops, tablets, smart-phones and mobile phones, including user's mobile phone.

20. The method of claim 11 where the Relying-Party-Service-Provider may be one of the group consisting of Banks, Financial Services, Online Shops, Online Voting Sites, Enterprise Websites, Smart Home, Mobile and Web applications.

* * * * *